United States Patent [19]
Huang

[11] Patent Number: 5,845,924
[45] Date of Patent: Dec. 8, 1998

[54] FOLDABLE MECHANISM FOR A STROLLER

[76] Inventor: Li-chu Chen Huang, No. 99, Fuchou 7th St., Chiayi City, Taiwan

[21] Appl. No.: 745,448
[22] Filed: Nov. 12, 1996
[51] Int. Cl.$^6$ ....................................................... B62B 7/06
[52] U.S. Cl. ........................ 280/642; 280/47.36; 280/47.4
[58] Field of Search .................................... 280/641, 642, 280/650, 658, 47.36, 47.38, 47.39, 47.4; 297/16.1, 46

[56] References Cited

U.S. PATENT DOCUMENTS

| 4,906,017 | 3/1990 | Kassai | 280/47.36 X |
| 5,056,805 | 10/1991 | Wang | 280/47.36 |
| 5,513,864 | 5/1996 | Huang | 280/47.36 |
| 5,549,311 | 8/1996 | Huang | 280/47.36 |
| 5,645,293 | 7/1997 | Cheng | 280/642 |

Primary Examiner—Brian l. Johnson
Assistant Examiner—Michael Mar
Attorney, Agent, or Firm—Oppenheimer Wolff & Donnelly LLP

[57] ABSTRACT

A stroller is designed to have a multi-step foldable mechanism which includes a connector having holes for receiving a back support with a long slot, a locking member having a stepped protrusion, a blocker, a tubular projection and a plate, and a receiving member for pivotally receiving the back support and securely receiving a front support. After the back support is inserted into the connector through the tubular projection of the locking member and one of the holes of the receiving member, a resilient member is inserted into a bottom of the back support and is suspended within the back support by a pin inserted into the locking member and received within the long slot of the back support, such that, when the blocker is lifted upward by a cylindrical projection formed on an outer periphery of an outer tube which is enclosing an arm of a handle, the stroller is folded. When the plate formed integrally with the locking member is being lifted axially upward, the stepped protrusion will be entirely extracted from the hole of the receiving member and achieve a purpose of folding and enhancement of safety while the stroller is being folded.

4 Claims, 16 Drawing Sheets

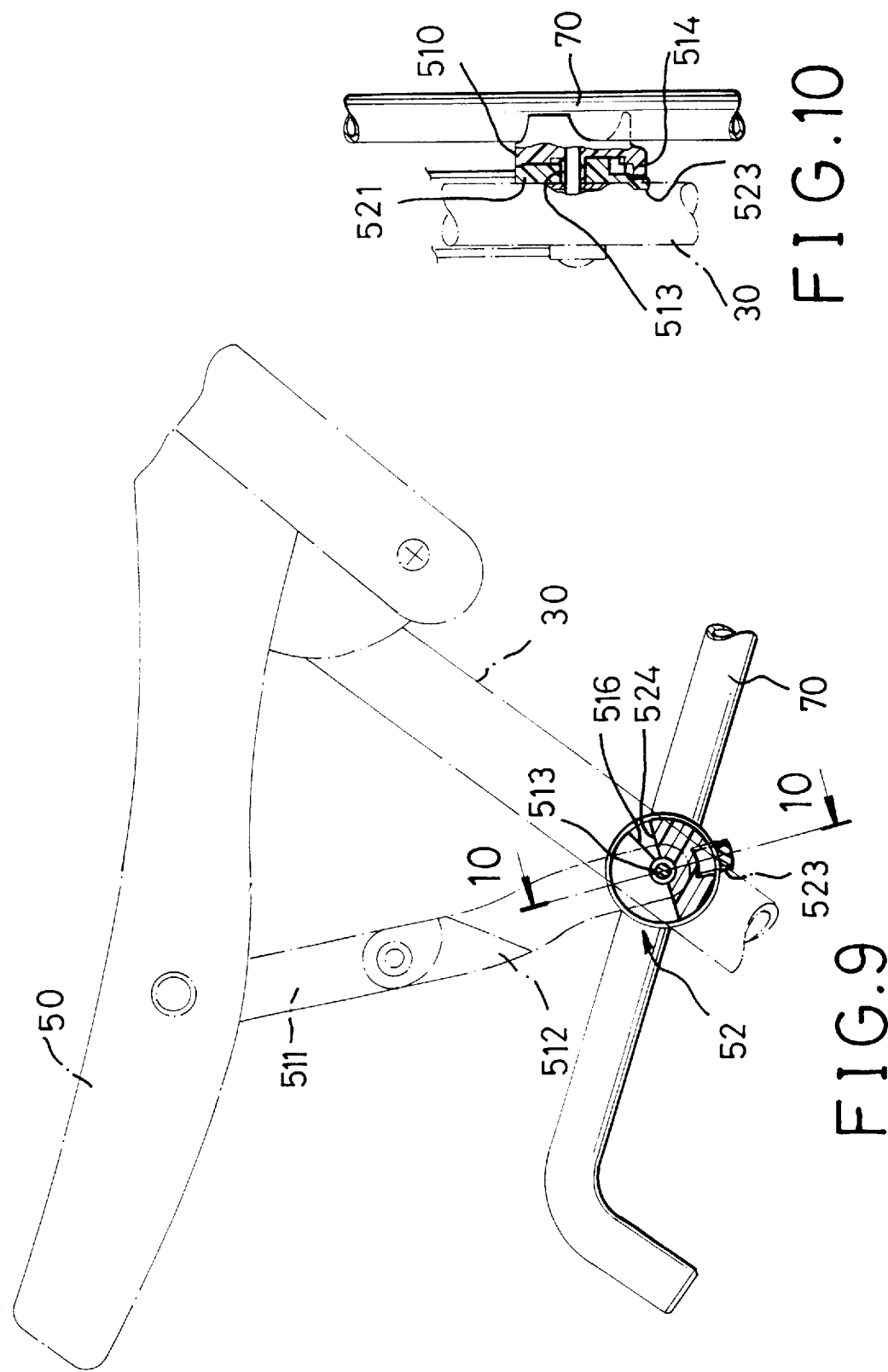

FOLDABLE MECHANISM FOR A STROLLER

FIELD OF THE INVENTION

The present invention generally relates to a stroller, and more particularly to a foldable mechanism which has a two-step folding process to emphasize the safety of the stroller. Furthermore, a handle of the stroller is pivotally connected with one of a plurality of supports to provide a direction change of the handle while pushing the stroller and running into a barrier.

BACKGROUND OF THE INVENTION

Strollers having a braking system for parking safely, wheels for steering, and foldable means for storage have been widely used all over the world. By means of the above mentioned improved devices, a user can provide a comfortable environment to a baby and convenience for herself/himself while walking outdoors.

Most of the devices are designed to provide a better environment for babies while walking outdoors, especially on paved roads. Yet, while walking on a rugged road, because a general stroller normally has four wheels, it is very difficult to push the stroller therealong.

Nowadays, entertainment recreation is emphasized for bringing families together and naturally, the number of outdoor activities will increase. Thus, if one of the families brought their child along to attend such an occasion, some family members will be busy pushing the stroller around in the wilderness. Even though they don't have to or can't push the stroller in some situations such as mountain climbing or crossing a river, they still have to carry the baby in their arm for a long time, which is very exhausting. When the baby is being held in an arm, the stroller is difficult to be folded with only one hand or it needs other people's help to fold the stroller of the prior art. Even though the prior stroller does have a mechanism for a user to operate the folding process of the stroller with only one hand, the mechanism still is not safe enough when being used, because the mechanism has only a single step for operating the whole folding process, thus a user may accidentally press a key member to function the folding process and cause an accident to the baby resting in the stroller.

From the previous description, it is noted that especially when holding a baby in one arm and still trying to fold the stroller, a general stroller with a folding mechanism which needs both hands of a user to operate it will not meet the requirement of practical needs or the standard of safety.

Thus, a stroller constructed in accordance with the present invention tends to mitigate and/or obviate the aforementioned problems.

SUMMARY OF THE INVENTION

The main objective of the invention is to provide a foldable mechanism for a stroller. The foldable mechanism includes a locking member which has a stepped protrusion integrally formed therewith. The stepped protrusion provides multiple steps in the folding process of the stroller, such that the safety of a baby will be further enhanced even if a key folding element of the stroller is accidentally pressed.

Another objective of the invention is to provide a stroller having a handle which is pivotally connected with one of a plurality of supports for providing a direction change of the handle while pushing the stroller along a road and encountering a barrier or making a U turn of the stroller.

Still another objective of the invention is to provide a stroller including a substantially "U" shaped handle, a pair of rear supports each pivotally connected with a respective arm of the handle and a distal end of each rear support is rotatably connected with a wheel, a bottom support pivotally connected with the rear support, a resting support detachably connected with the handle and pivotally connected with a pair of front supports through two foldable connecting members, whereby each distal end of the two front supports is respectively and rotatably connected with a wheel, and a foldable mechanism detachably connected with the resting support and a back support detachably connected with the resting support by way of the foldable mechanism and pivotally connected with the bottom support. The back support which is resting within a seat provided integrally within the foldable mechanism will automatically fall out of the seat while the stroller constructed in accordance with the present invention is folded.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein;

FIG. 9 is a partial sectional view of the restraining device;

FIG. 10 is a sectional view of line 10—10 of the restraining device shown in FIG. 9;

DETAILED DESCRIPTION OF THE PREFERRED EMBODIMENT

Figure 1:
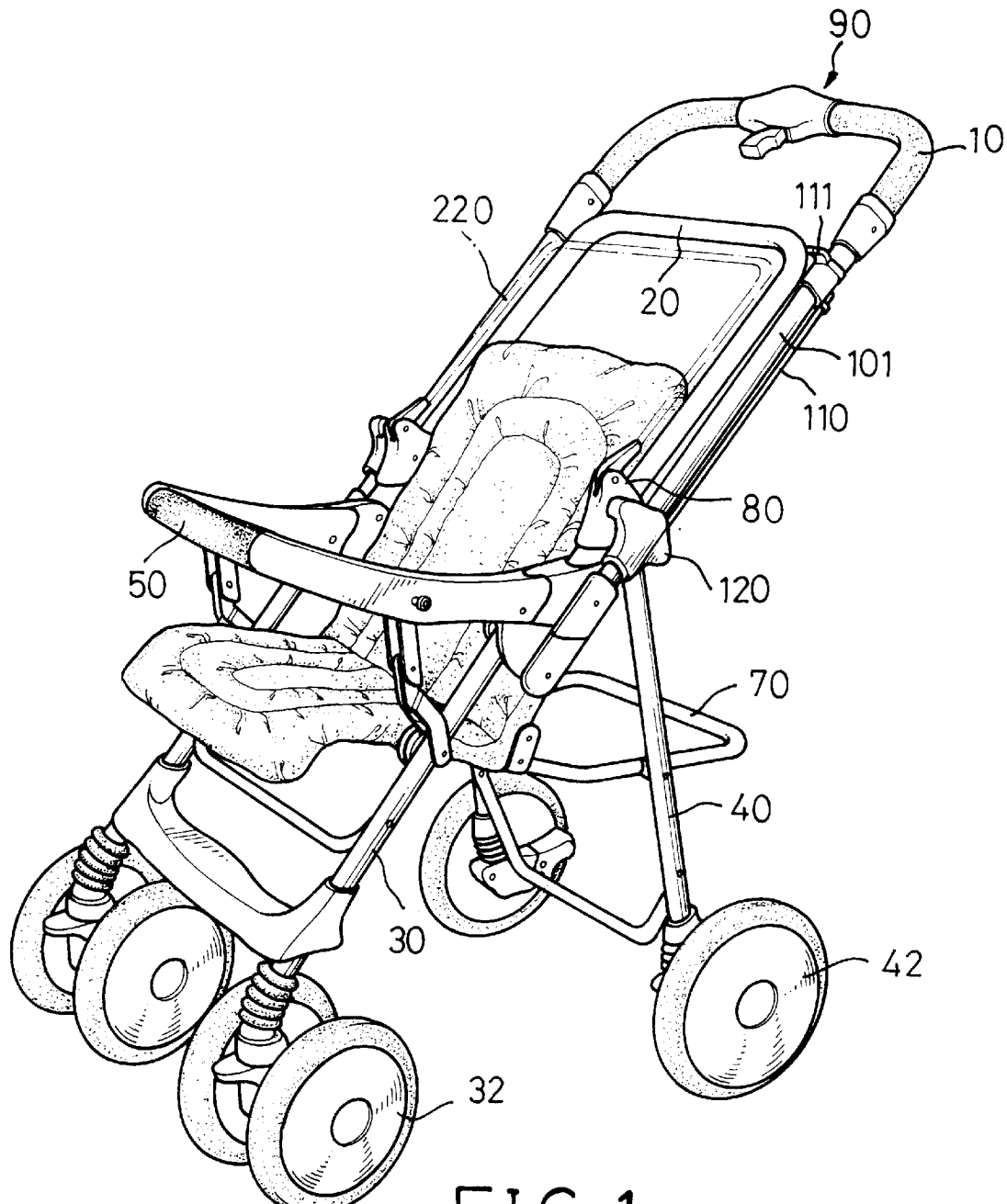
FIG. 1 is a perspective view of a stroller incorporating a foldable mechanism in accordance with the present invention.

Referring to FIG. 1, one preferred embodiment of the invention is shown. A stroller constructed in accordance with the present invention includes a "U" shaped handle 10, a pair of rear supports 40 pivotally connected with the handle 10, a substantially "U" shaped back support 20 pivotally and detachably connected with the handle 10 and pivotally connected with the rear support 40, a bottom support 70 pivotally connected with the rear support 40, a resting support 50 pivotally connected with a foldable mechanism which is detachably connected with the handle 10 and a pair of front supports 30. Each distal of the pair of the rear support 40 and the pair of the front supports 30 have a wheel 42, 32 respectively and rotatably connected thereto such that the stroller constructed in accordance with the present invention is able to move.

Figure 2:
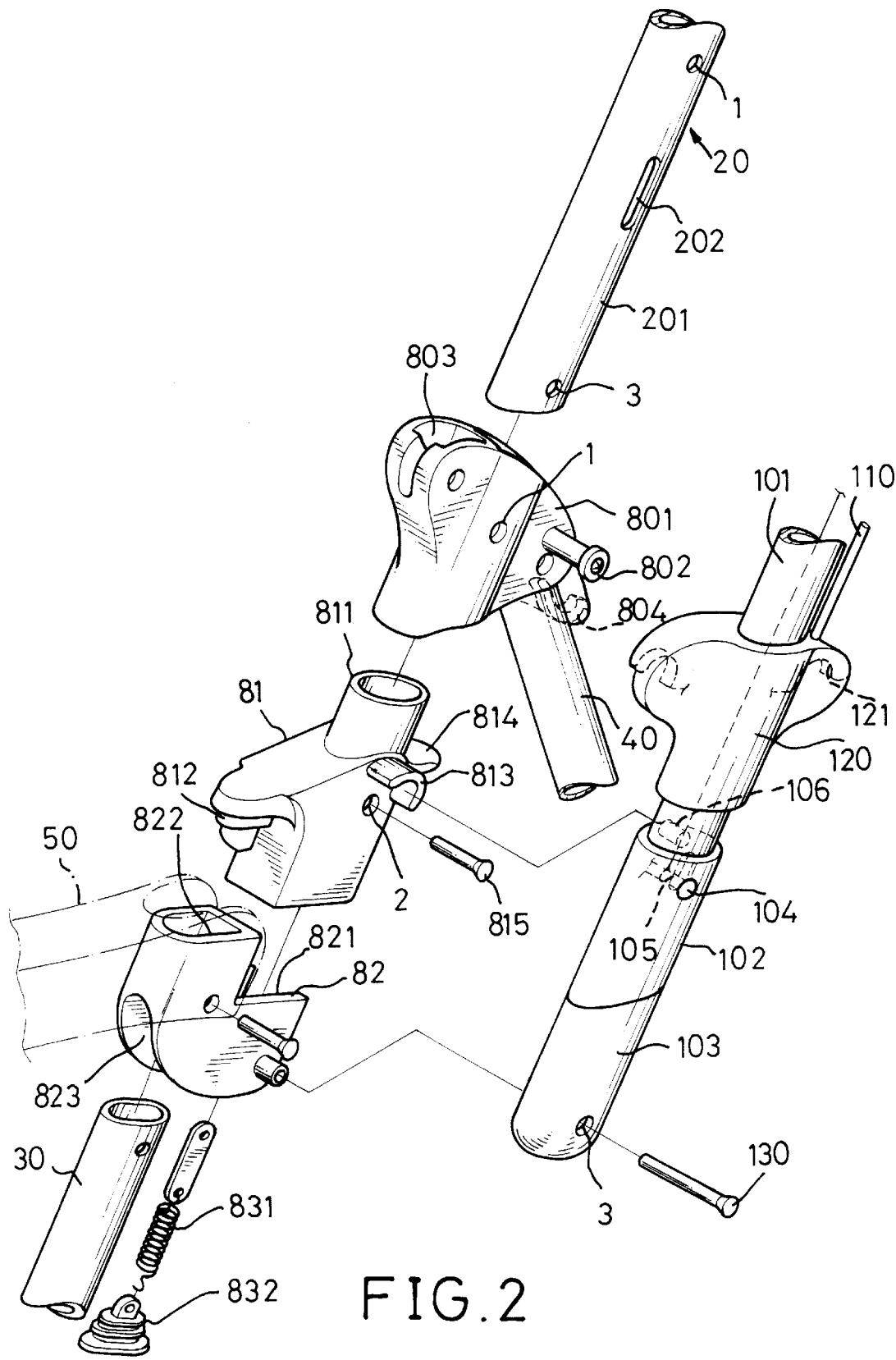
FIG. 2 an exploded view of the foldable mechanism of the invention.

Referring to FIGS. 1 and 2, the handle 10 is pivotally connected with the foldable mechanism 80 by means of a third pin 130. A driving element 120 is movably connected with the handle 10 which further comprises a pair of traction devices 110 having a hook 111 integrally formed therewith and slidably connected with the top portion of an arm 101 of the handle 10 such that the driving element 120 is able to be tracked by way of the hook 111 of the traction device 110 to accomplish a change in direction of the handle 10, which will be described later. A switch 90 is mounted onto the handle 10 to control the folding process of the stroller.

Referring again to FIG. 2, an exploded view of the foldable mechanism 80 and the driving element 120 are shown. The traction device 110, as shown in FIG. 1, includes a first end (not numbered) having the hook 111 slidably connected with the arm 101 of the handle 10 and a second end securely connected within the driving element 120 so that when a user of the stroller pulls axially upward the hook 111, the driving element 120 will be tracked along the axial direction of the arm 101 and toward the same direction as the moving direction of the hook 111. Furthermore, a pair of opposed recesses 121 are provided on the driving element 120 of the traction device 110. A connector 801 has a first pin 802 securely connected therewith and protruding out of a face of the connector 801, such that the first pin 802 is detachably received within one of the opposed pair of recesses 121. Therefore, when the hook 111 of the traction device 110 is pulled upward, the driving element 120 will be pulled upward leaving the constraint of the first pin 802 and moved along the axial direction of the arm 101 of the handle 10 and consequently the driving element 120 will leave the constraint of the pin 802 and thus is pivotable to swing back and forth.

Figure 3:
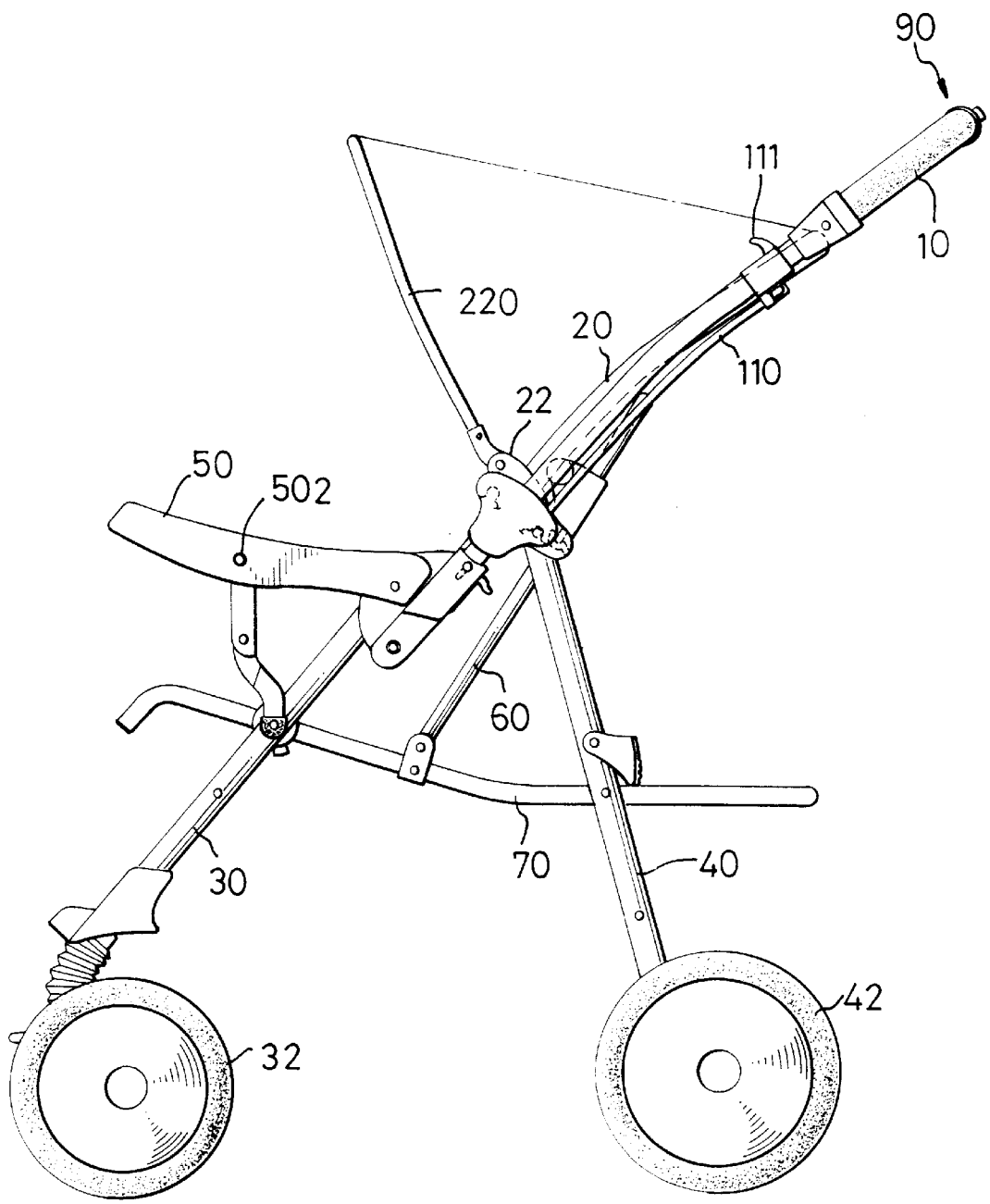
FIG. 3 is a side view of the stroller.
Figure 4:
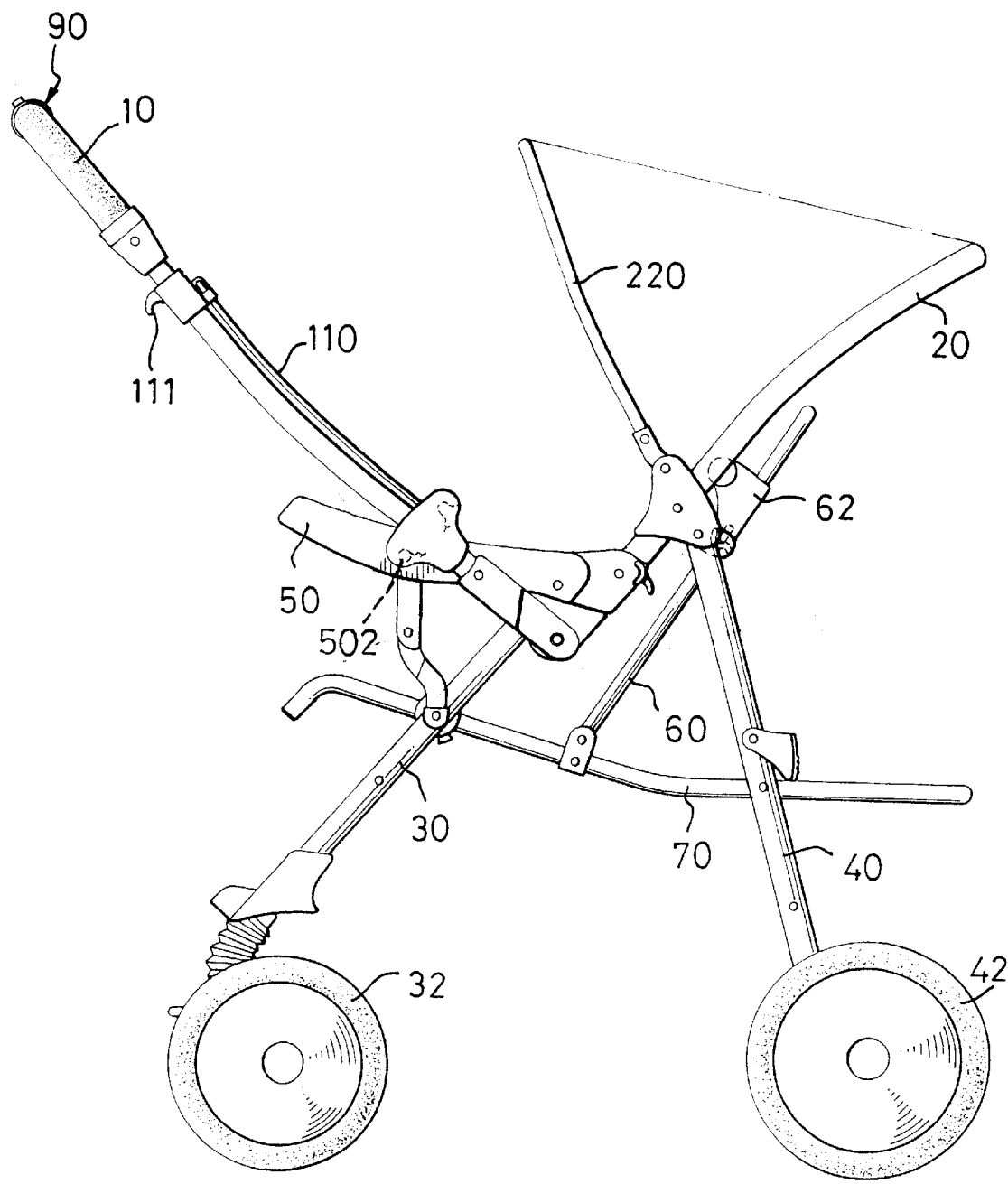
FIG. 4 is a further a side view of the stroller showing that a handle of the stroller is shifted toward another side of the stroller.

FIGS. 3 and 4 show that the handle 10 is pivoted to another position and rested on a second pin 502 provided on the resting support 50, while other members of the stroller remain unchanged.

Figure 5:
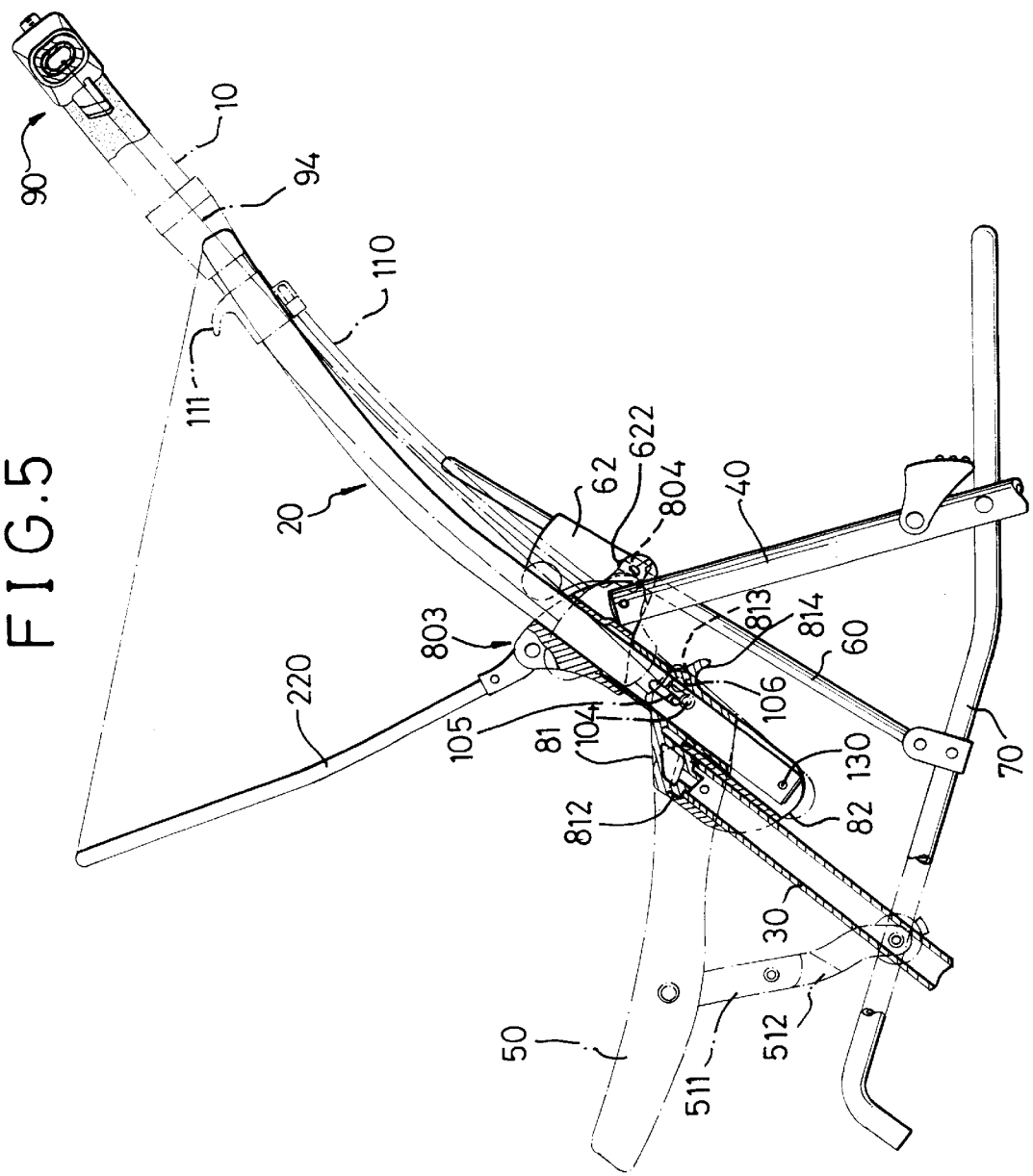
FIG. 5 is a partial sectional view of the stroller showing members related to the process of the falling of a back support.

Referring to FIGS. 2 and 5, as previously described, the connector 801 having the first pin 802 provided thereto further includes three holes (not shown) for receiving respectively one arm 201 of the back support 20, one arm (not numbered) of the rear support 40 and a tubular protrusion 811 of a locking member 81 and a seat 803 for pivotally receiving a sun-shade 220. A catch 804 protrudes out at the rear portion of the connector 801 and is formed integrally therewith for receiving a seat back 60 which is pivotally connected with the bottom support 70. The locking member 81 further has a stepped protrusion 812, a blocker 813 and a plate 814. A fourth pin 815 is inserted into the locking member 81 and received within a long slot 202 provided on the arm 201 of the back support 20 after the arm 201 of the back support 20 is inserted into the connector 801 and into the locking member 81 through the tubular protrusion 811. A receiving member 82 is configured to have three holes 821, 822 and 823 for respectively receiving the arm of the back support 20, the stepped protrusion 812, and an arm (not numbered) of the front support 30, thus, a through hole defined within the connector 801, the tubular protrusion 811 and the hole 821 communicate with each other for allowing the arm 201 of the back support 20 to be inserted therein. A resilient member 831 securely connected with a cover 832 is therefore inserted into the bottom of the arm 201 of the back support 20 and the cover 832 tightly engages with the bottom of the arm 201. Additionally, the resilient member 831 is suspended within the arm 201 by means of the fourth pin 815 which is inserted into the locking member 81, then inserted through the long slot 202 of the arm 201 of the back support 20.

Figure 6:
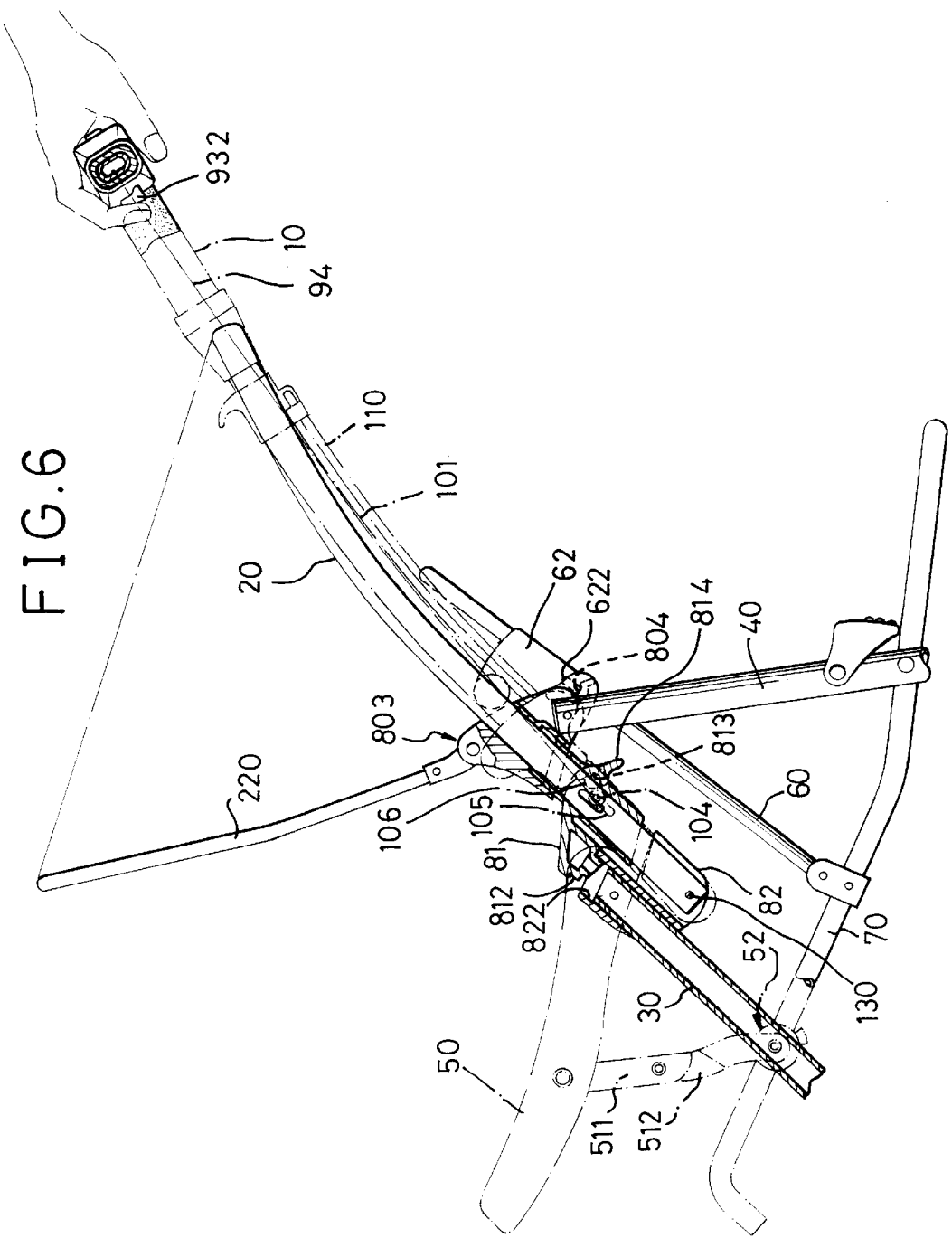
FIG. 6 is a partial sectional view of the stroller showing the related process within the stroller when a switch is pressed.

It is also noted that the bottom of the arm 101 of the handle 10 is surrounded by an outer tube 102 detachably connected with a bottom tube 103 which is connected with the receiving member 82 by the third pin 130. A small opening (not numbered) is defined in a peripheral face of the outer tube and a fifth pin 104 is inserted therein and rested in a small slot 105 defined in a periphery of the arm 101 of the handle 10. A cylindrical projection 106 is formed integrally with the arm 101 of the handle 10 such that the cylindrical projection 106 rests within the blocker 813 when the arm 101 of the handle 10 is pivotally connected with the receiving member 81 by means of the third pin 130. A pulling member 91 securely connected with a first end of a steel wire 94 is slidably mounted laterally on an outer periphery of the handle 10 and a second end of the steel wire 94 is thus securely connected with the fifth pin 104 which is inserted into the small opening defined in the periphery of the arm 101 of the handle 10. Therefore, as shown in FIG. 6, when a user pulls upward the pulling member 91, the steel wire 94 within the arm 101 of the handle 10 will also be pulled upward, and eventually the fifth pin 104 inserted into the small opening (not numbered) of the outer tube 102 and rested within the small slot 105 will be pulled toward the same direction as the pulling member 91 is moved. Because the fifth pin 104 is inserted into the small opening of the outer tube 102, the outer tube 102 will also have a moving distance when the pulling member 91 is pulled upward. Thus, when the outer tube 102 is moved upward, the cylindrical protrusion 106 formed oppositely to the small slot 105 will also be pulled upward. Consequently, the blocker 813 formed integrally with the locking member 81 will be moved toward the same direction as the steel wire 94 is moved.

As described earlier, the stepped protrusion 812 of the locking member 81 is detachably received within the hole 822 of the receiving member 82. The length of the long slot 202 is twice as long as the length of the small slot 105 of the outer tube 102 enclosing the arm 101 of the handle 10, and the length of the long slot 202 is at least the same as or even longer than the vertical length of the stepped protrusion 812, therefore, when the outer tube 102 is pulled upward along the length of the small slot 105, the distance traveling along the length of the small slot 105 can only permit a part of the stepped protrusion 812 to leave out of the hole 822 and thus not the entire locking member 81 is pulled out of the hole 822, thus, an assistance to pull the rest of the locking member 81 to leave the hole 822 is required.

Figure 7:
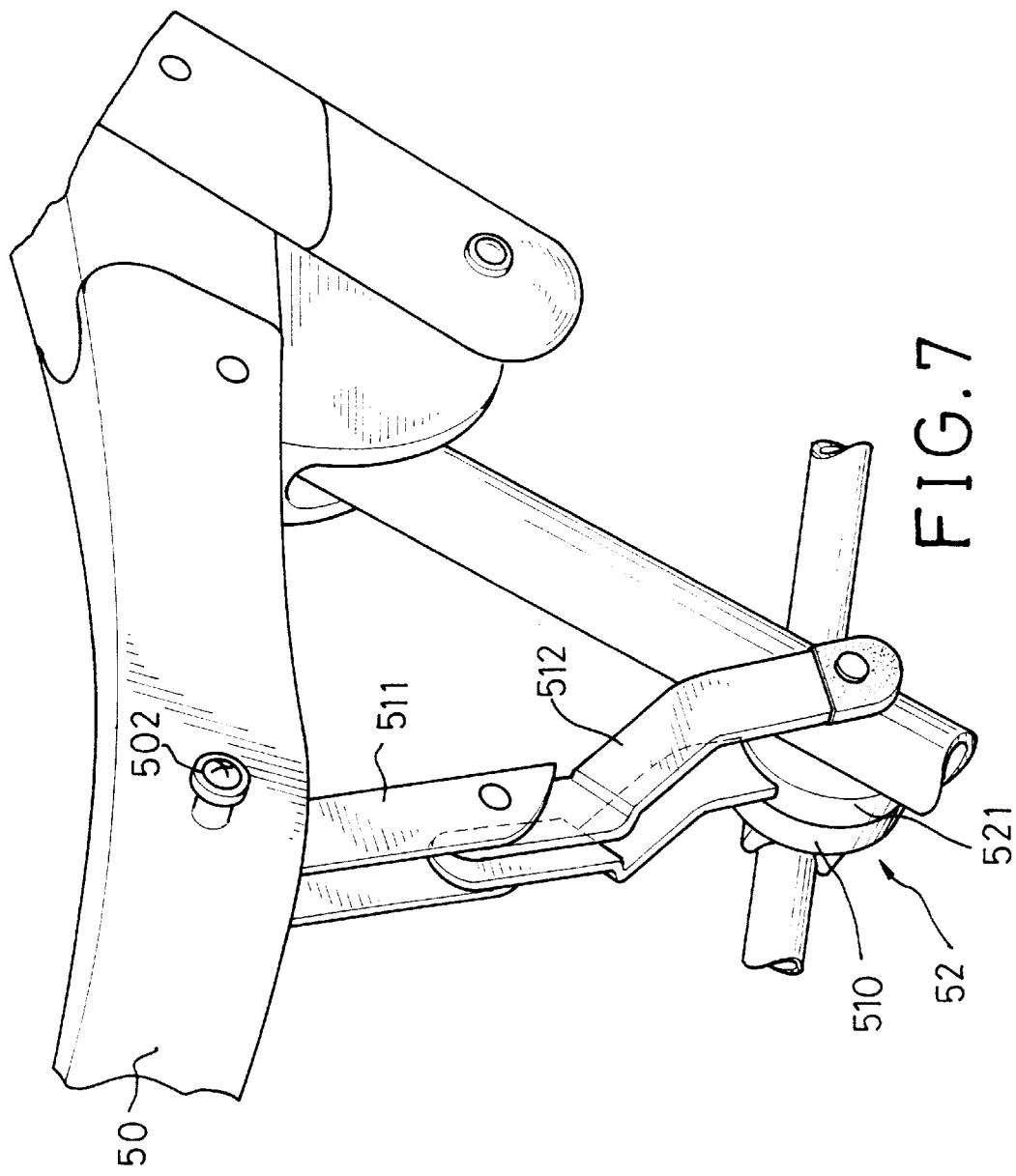
FIG. 7 is a perspective view of the foldable mechanism being separated from a resting support.
Figure 8:
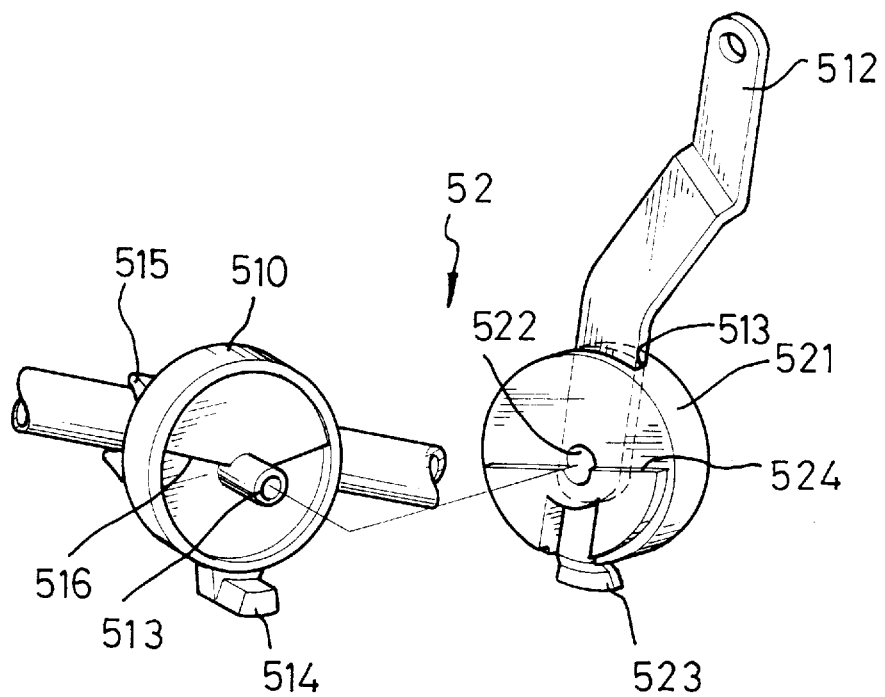
FIG. 8 is a perspective view of a restraining device.

Referring to FIG. 7, and taking FIG. 8 for reference, a restraining device 52 having an outer element 521 and an inner element 510 is pivotally connected with the front support 30 and a distal end of the bottom support 70. The outer element 521 has a first hole 522 defined therein, a blind hole 513 defined on an outer peripheral face thereof for receiving the second plate 512 and a resilient element 523 slightly protruding out from the peripheral face thereof. A protrusion 524 is also formed on an inner face thereof. The inner element 510 has a second hole 513 defined therein, a block 514 formed integrally and protruding out from an inner face thereof, a notch 515 defined in an outer face thereof for receiving a portion of the bottom support 70 and a recess 516 defined and configured to mate the protrusion 524 of the outer element 522.

Figure 11:
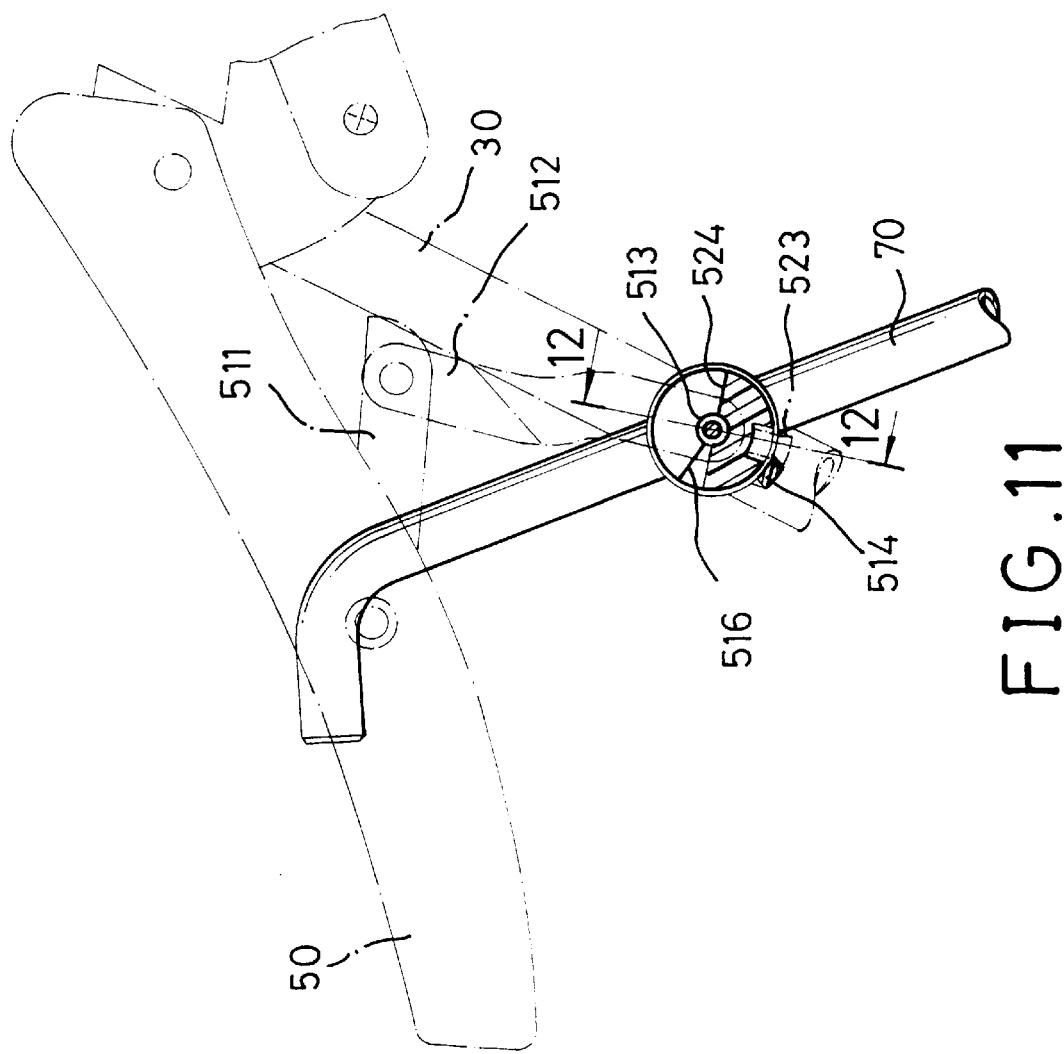
FIG. 11 is a schematic sectional view of the restraining device showing the relative position of the restraining device after being rotated for a certain angle.

As seen from FIG. 9, when the restraining device 52 is assembled, the protrusion 524 of the outer element 522 is securely mated with the recess 516 of the inner element 510, and when the stroller of the invention is being folded, the relative angle between the bottom support 70 and the front support 30 will thus be changed. Because a portion of the bottom support 70 is received within the notch 515 of the inner element 510, the inner element 510 will thus be pushed by the bottom support 70 and turn along with the bottom support 70. The outer element 512 will, therefore, be rotated due to the rotation of the inner element 510 and the secure connection between the protrusion 524 of the outer element 512 and the recess 516 of the inner element 510 (as shown in FIG. 11). The rotation of the outer element 512 will result in the folding of the second plate 512 relative to the front support 30. It is noted that when the restraining device 52 is assembled, a proper gap (not shown or labeled) existing between the protrusion 524 of the outer element 522 and the recess 516 of the inner element 510 allows a safe distance for the stroller's folding process. Because under a normal operation condition, if a third person touches the switch 90 accidentally and causes a first step of the stepped protrusion 812 to be protruded out of the receiving member 82 and the second step of the stepped protrusion still remains within the receiving member 82, the resting support 50 will not be able to be folded automatically and therefore causes danger to a baby.

Figure 12:
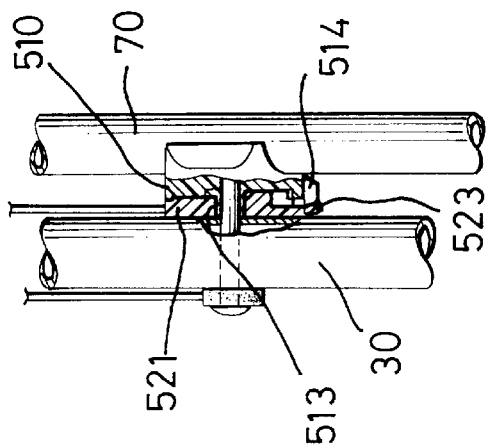
FIG. 12 is a sectional view of line 12—12 of the restraining device shown in FIG. 11.

Referring to FIGS. 9 and 10, when the stroller of the invention is in use, the resilient element 523 of the outer element 522 and the block 514 of the inner element 510 will somewhat rest in a relative superposition position with each other and the resilient element 523 has no any relative motion with the block 514. Yet, when the stroller of the invention is being folded, due to the relative rotation between the resilient element 523 and the block 514, the resilient element 523 abuts and being pushed by the front support 30 and therefore causes a separation between the resilient element 523 and the block 514, as shown in FIGS. 11 and 12, which provides a blocking effect to the resting supporting 50 to prevent an accidental unfolding and inconvenience to the user while the stroller is folded and being carried along.

Figure 13:
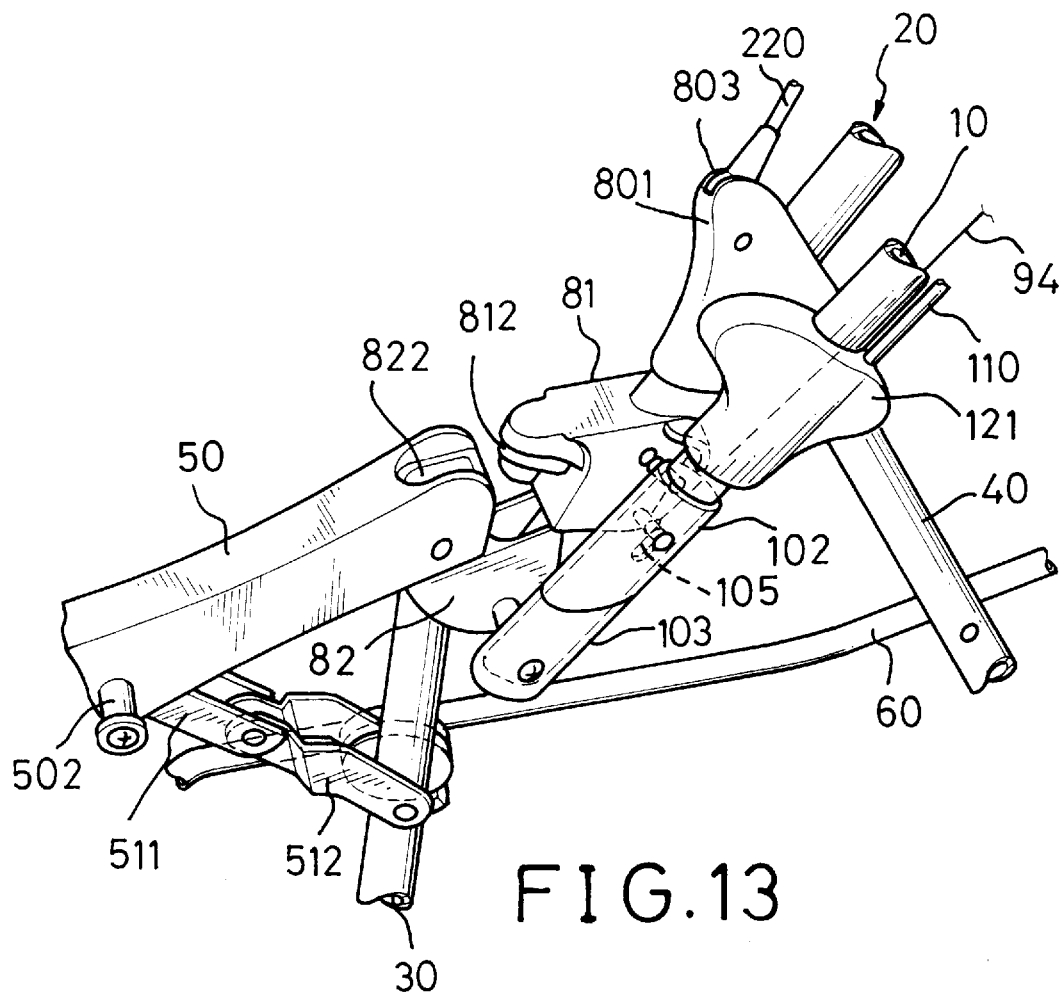
FIG. 13 is a perspective view of the restraining device pivotally connected with the front support and the second plate.

Referring to FIG. 2 and FIG. 13, as the plate 814 is integrally formed with the locking member 81 and opposed to the stepped protrusion 812, a user will have to bend over to reach the plate 814 and pull the plate 814 axially upward by finger to have the rest of the locking member 81 leave the hole 822. The resting support 50 is pivotally connected with the front support 30 by way of a connecting member 51 having a first plate 511 and a second plate 512 pivotally connected with the first plate 511. Thus, when the rest of the locking member 81 is pulled out of the hole 822 by pulling the plate 814 axially upward, the resting member will automatically fold due to the pivotal connection with the front support 30.

Figure 14:
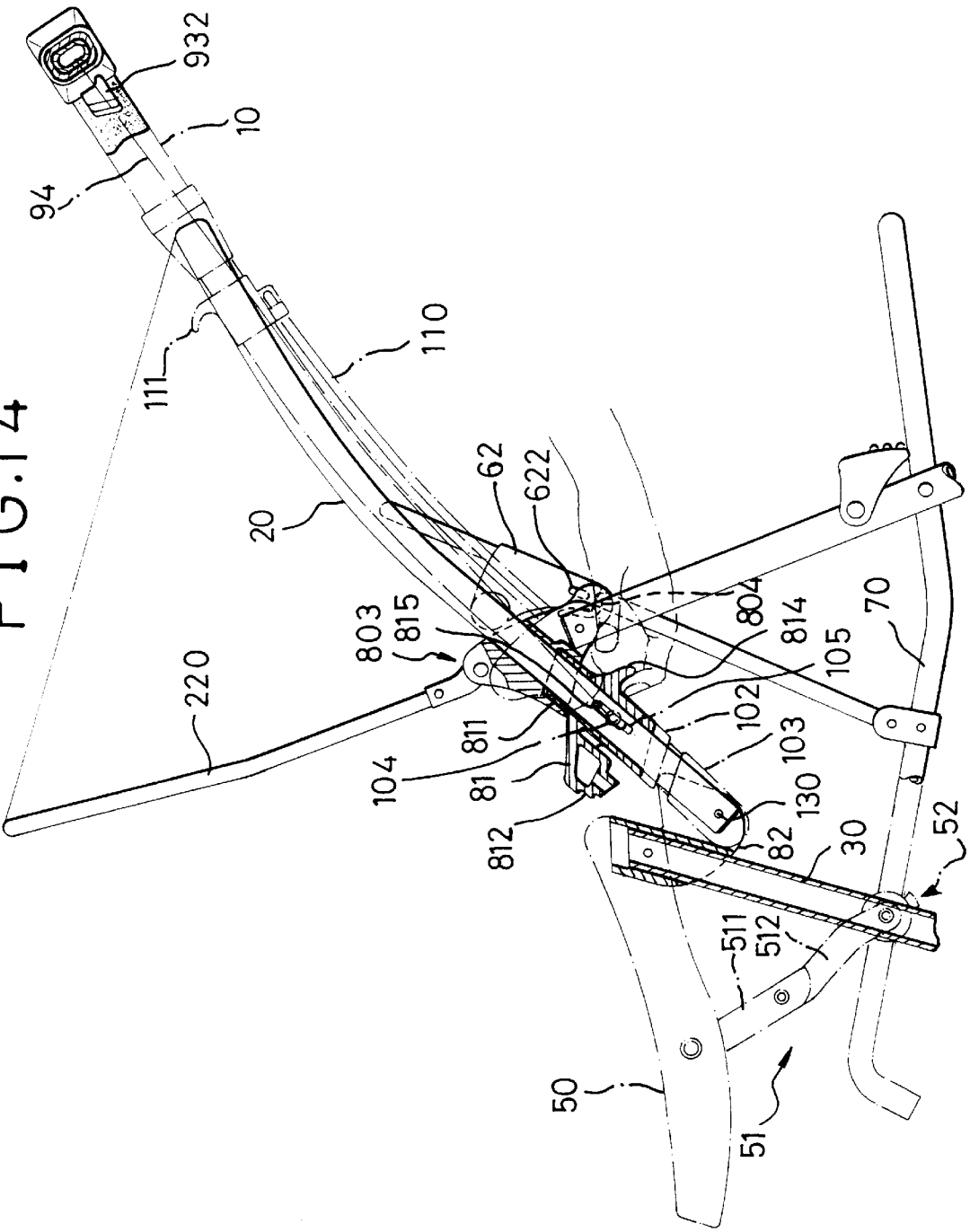
FIG. 14 is a partial sectional view of the stroller showing that the back support of the stroller is about to leave the seat formed integrally on the foldable mechanism.
Figure 15:
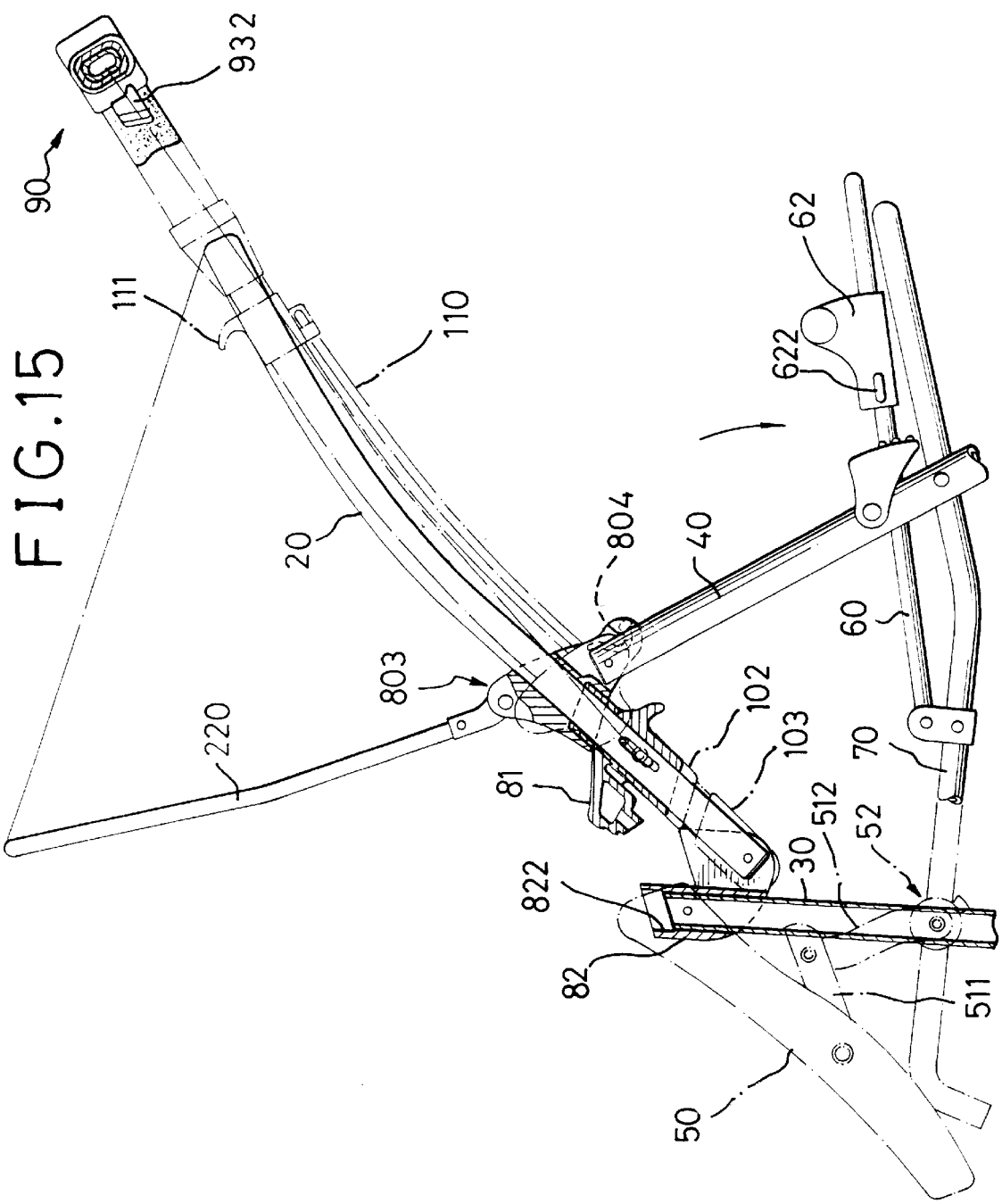
FIG. 15 is another partial sectional view of the stroller shown in FIG. 14 showing that the back support of the stroller has left the seat of the foldable mechanism.

Referring to FIG. 2 and FIGS. 14 and 15, the seat back 60, as previously described, rests in the catch 804 of the connector 801 by a protrusion 622 laterally protruding out from a lateral side of a combining member 62 of the seat back 60. When the locking member 81 has first entirely left the hole 822, the seat back 60 still remains within the catch 804. When the handle 10 together with the foldable mechanism 80 continue to fold toward the direction as indicated by an arrow in the figure, the inclined angle for the seat back 60 will gradually increase, and the seat back 60 will finally automatically fall to the bottom support 70 and align with the bottom support 70.

Figure 16:
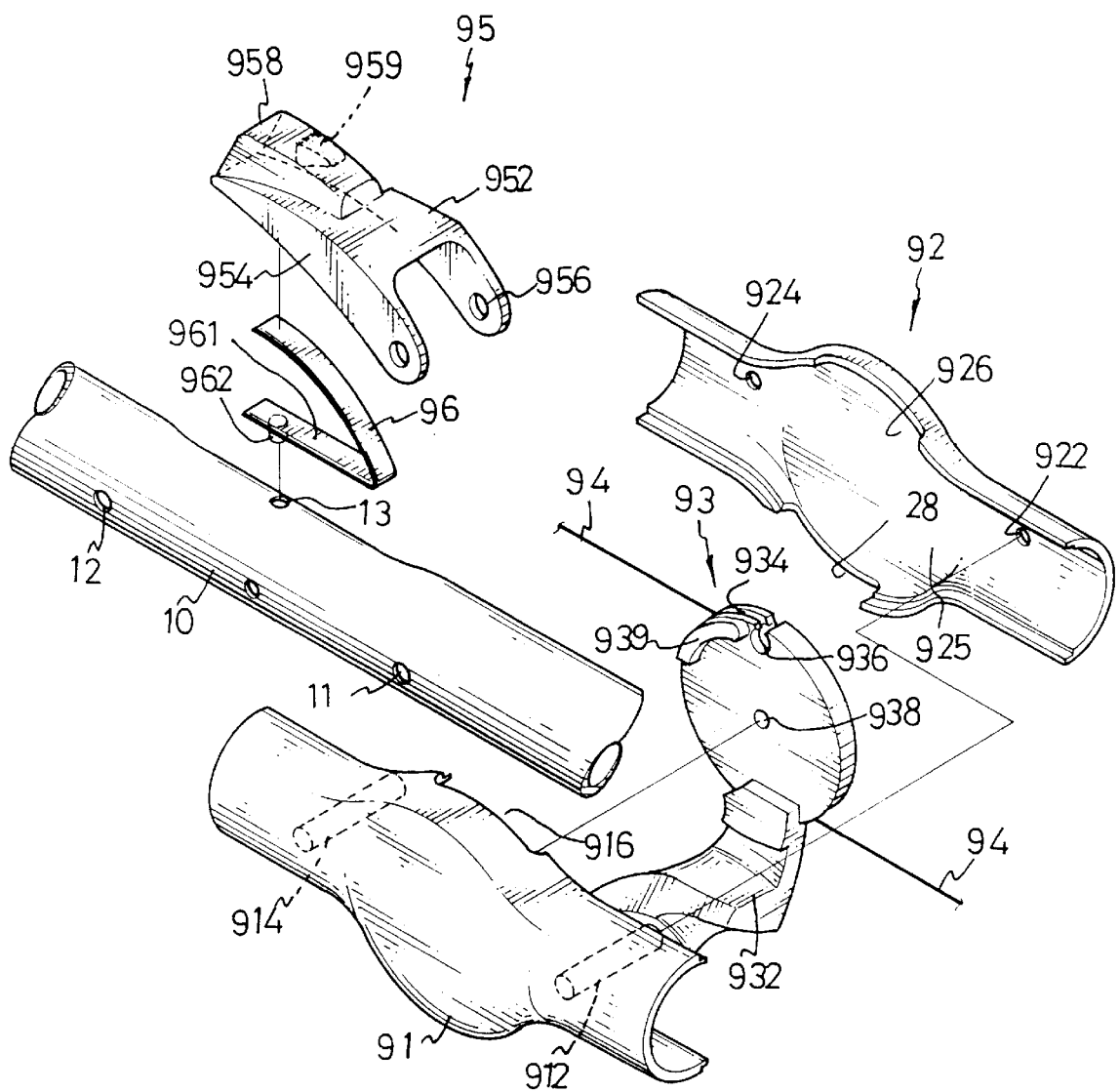
FIG. 16 is an exploded view of the switch.
Figure 17:
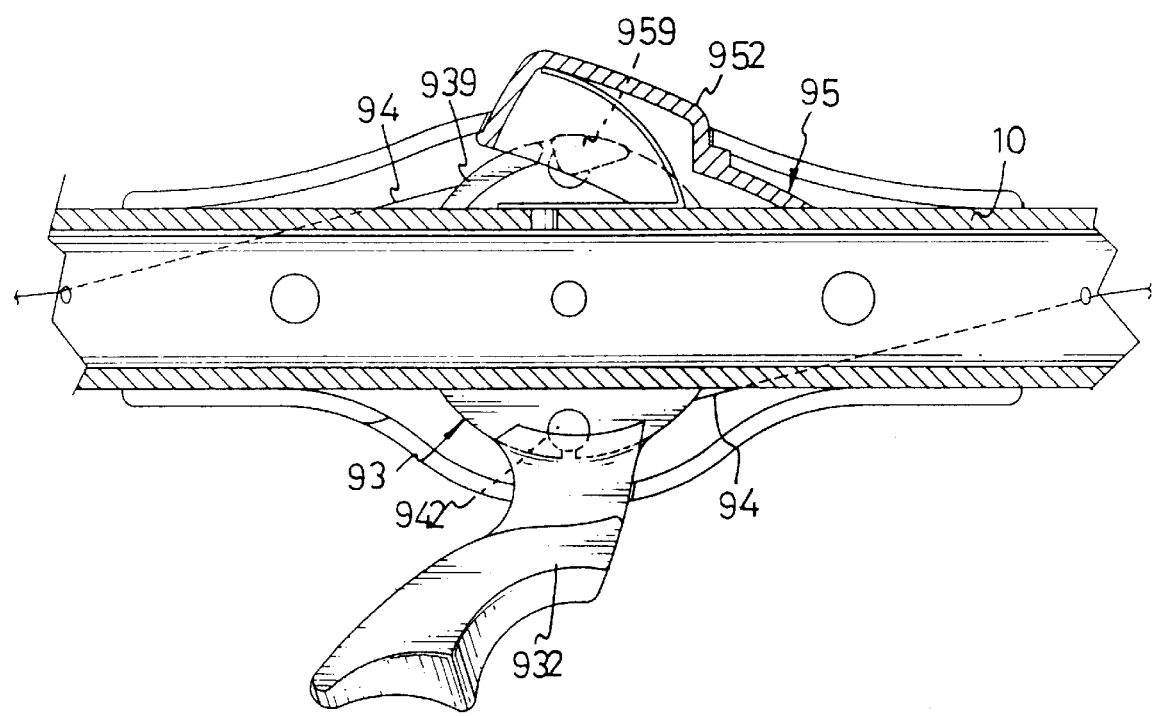
FIG. 17 is a sectional view of the switch showing related members within the switch after combination.

Referring to FIG. 1 and further to FIGS. 16 and 17, the switch 90 includes a front cover 91 and a rear cover 92 sized and configured to extend around the central portion of the handle 10. It is to be noted that the front cover 91 is disportionately greater than the rear cover 92 such that the front cover 91 extends over a greater part of a circumference of the handle 10. A compartment 925 is defined between the rear cover 92 and the handle 10. A first peg 912 and a second peg 914 are spaced apart and extend integrally and perpendicularly from an inner face of the front cover 91. A first pair of aligned transverse holes 11 corresponding to the first peg 912 is defined in a central portion of the handle 10. A second pair of aligned transverse holes 12 corresponding to the second peg 914 is defined in the central portion of the handle 10. A first hole 922 and a second hole 924 also corresponding to the first and second pegs 912, 914 are defined in the rear cover 92. A first cutout 916 is defined in a top portion of the front cover 91 and a second cutout 926 corresponding to the first cutout 916 is defined in a top portion of the rear cover 92 such that when the front and the rear covers 91, 92 are combined to enclose the central portion of the handle 10, an opening (not numbered) is thereby defined. A first arcuate slot 928 is defined in a bottom of the rear cover 92.

A disk 93 comprises a lever 932 extending from a circumferential periphery thereof, two diametrically opposed circumferential grooves 934, each terminating in a transverse socket 936, and a central bore 938. An arcuate flange 939 is formed at an upper portion of a first side of the disk 93. A pin (not shown) pivotally secures the disk 93 to a side of the central portion of the handle 10, such that the first side of the disk 93 is adjacent to the handle 10. The disk 93 is received in the compartment 925 between the handle 10 and the rear cover 92. The lever 932 extends through the first arcuate slot 928 of the rear cover 92.

A latch 95 is substantially U-shaped and has a middle portion 952 from which two spaced-apart arcuate limbs 954 downwardly extend, each limb 954 defining a pivot hole 956 near a distal tip thereof. The middle portion 952 of the latch 95 has formed on a top surface thereof a button 958 sized and configured to extend through the opening defined by the front and rear covers 91, 92. The arcuate limbs 954 of the latch 95 define a distance therebetween such that the diameter of the handle 10 may be received therein whereby the first peg 912 of the front cover 91 extends through one of the pivot holes 956, the first pair of transverse holes 11, the remaining pivot hole 956 and the first hole 922 of the rear cover 92. The second peg 914 extends through the second pair of transverse holes 12 and the second hole 924 of the rear cover 92. Distal tips of the first peg 912 and the second peg 914 can be deformed, e.g., by heat, after they have projected through the rear cover 92 such that the front cover 91, the rear cover 92, the disk 93 and the latch 95 can be securely assembled.

A resilient member 96, for example, a leaf spring, has a flat element 960 and an arcuate element 961 integrally extending upwardly from one end thereof, and a location lug 962 extending downwardly from a bottom face of the flat element 960. The resilient member 96 is disposed between a top of the central portion of the handle 10 and an underside of the middle portion 952 of the latch 95 with the location lug 962 being securely retained in a top hole 13 defined in the top of the central portion of the handle 10. Whereby, the resilient member 96 urges upwardly the latch 95 so that the button 958 projects reciprocatingly through the opening. Furthermore, an inner face of one of the arcuate limbs 954 has perpendicularly formed thereon a stop 959 sized and disposed to abut the arcuate flange 939 when the latch 95 is in a non-depressed condition as shown in FIG. 17, whereby the switch 90 is in an engaged state. A pair of cables 94 each have a first end with a nipple 942 (as shown in FIG. 17) fixed thereto and received within the socket 936. The nipples 942 are sized and configured to be received in respective sockets 936 of the disk 93 whereby the cables 94 are received in the corresponding circumferential grooves 934 and further extend in opposite directions inside the handle 10.

Figure 18:
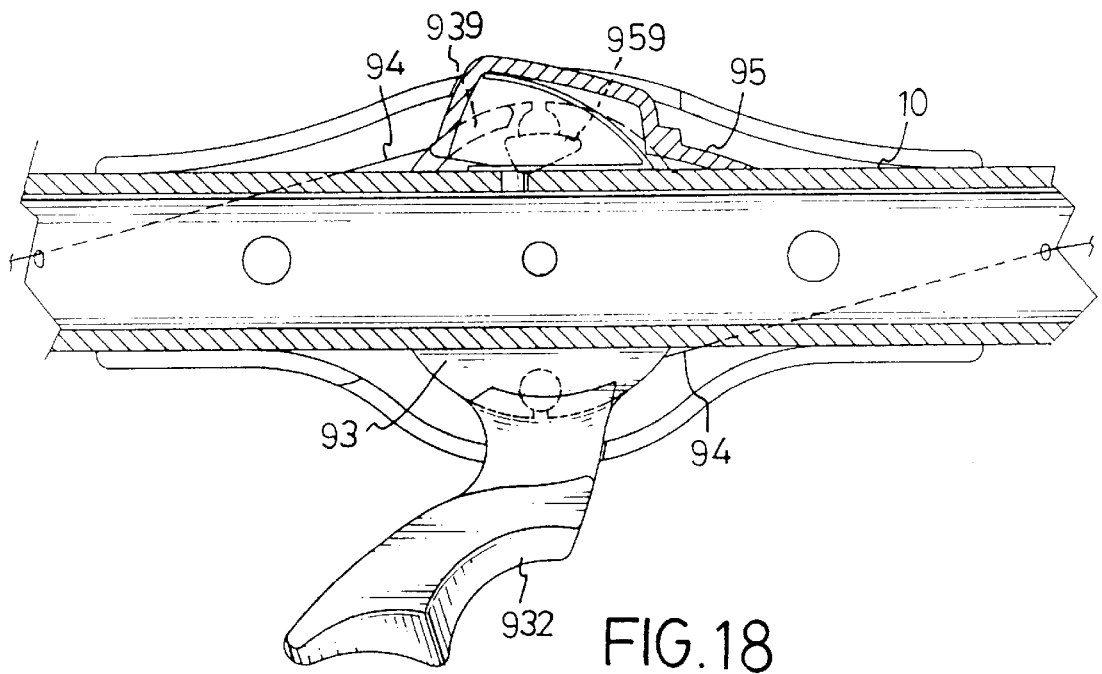
FIG. 18 is a schematic view of the switch showing the relative movement of a disc provided with a pair of steel wires corresponding to the movement of a trigger.
Figure 19:
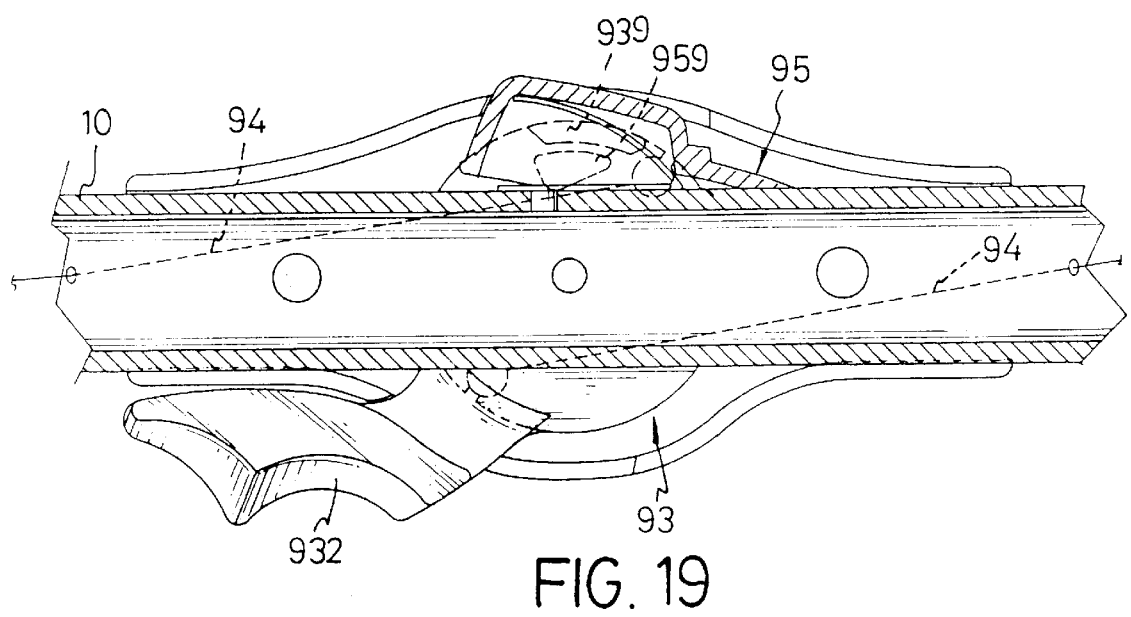
FIG. 19 is a schematic view of the switch showing the steel wires provided on the disc are tracked to cause the detachment of the foldable mechanism of the stroller as shown in FIGS. 6 and 7.

Referring to FIG. 18, the latch 95 is depressed by a user by which abutment between the stop 959 and the arcuate flange 939 is released and the lever 932 can pivot to a fully disengaged state as shown in FIG. 19. Therefore, if the latch 95 is fully depressed, the pair of cables 94 will link to the traction device 110 disposed on both sides of the stroller and thus the first step of the folding process of the stroller is completed.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A foldable mechanism for a stroller comprising:

a handle having a pair of arms with a small slot provided therein and a switch;

a bottom support pivotally connected with said arms of rear support, the rear support having distal ends with wheels rotatably connected thereto;

a back support having a long slot;

a front support pivotally connected with said bottom support and pivotally connected with said rear support the front support having ends with wheels rotatably connected thereto;

a pair of foldable mechanisms each having:
a connector having a catch integrally formed therewith, holes for slidably receiving said back support and said rear support therein and a first pin mounted therein;
a locking member with a stepped protrusion, a tubular projection, a blocker, and a plate integrally formed therewith; and
a receiving member pivotally connected with said back support and having holes for detachably receiving said stepped protrusion and securely receiving said back support and said front support therein;

a resting support pivotally connected with said front support by means of said receiving member of said foldable mechanism and having a second pin laterally protruding from a side support of said resting face;

a traction means having
a hook slidably connected with a top portion of said handle;
a driving element slidably enclosing said arm of said handle and having a pair of recesses for detachably connecting with respect to said first pin of said connector of said foldable mechanism and said second pin of said resting support; and
a traction element securely connected between said hook and said driving element;

a pulling member securely connected with a steel wire;

an outer tube enclosing said arm of said handle having a cylindrical projection protruding out from a periphery thereof and integrally formed thereon for engaging with said blocker of said locking member, and a third pin inserted into said periphery thereof and resting within said small slot of said arm of said handle; whereby said steel wire is securely connected with said third pin after said third pin is inserted into said small slot; and a resilient member having a cover securely inserted into a bottom portion of said back support and securely connected within said locking member by means of a fourth pin inserted into said locking member and resting within said long slot of said back support.

2. The foldable mechanism of a stroller as claimed in claim 1, wherein a length of said long slot is at least twice as long as a length of said small slot of said arm of said handle.

3. The foldable mechanism of a stroller as claimed in claim 1 further comprising a seat back pivotally connected with said connector of said foldable mechanism.

4. The foldable mechanism for a stroller as claimed in claim 3, wherein said seat back is snugly received within said catch of said connector of said foldable mechanism.

* * * * *